Jan. 19, 1971 N. P. SOGOIAN 3,555,591
FRICTION-TYPE DOOR CHECK
Filed June 25, 1968
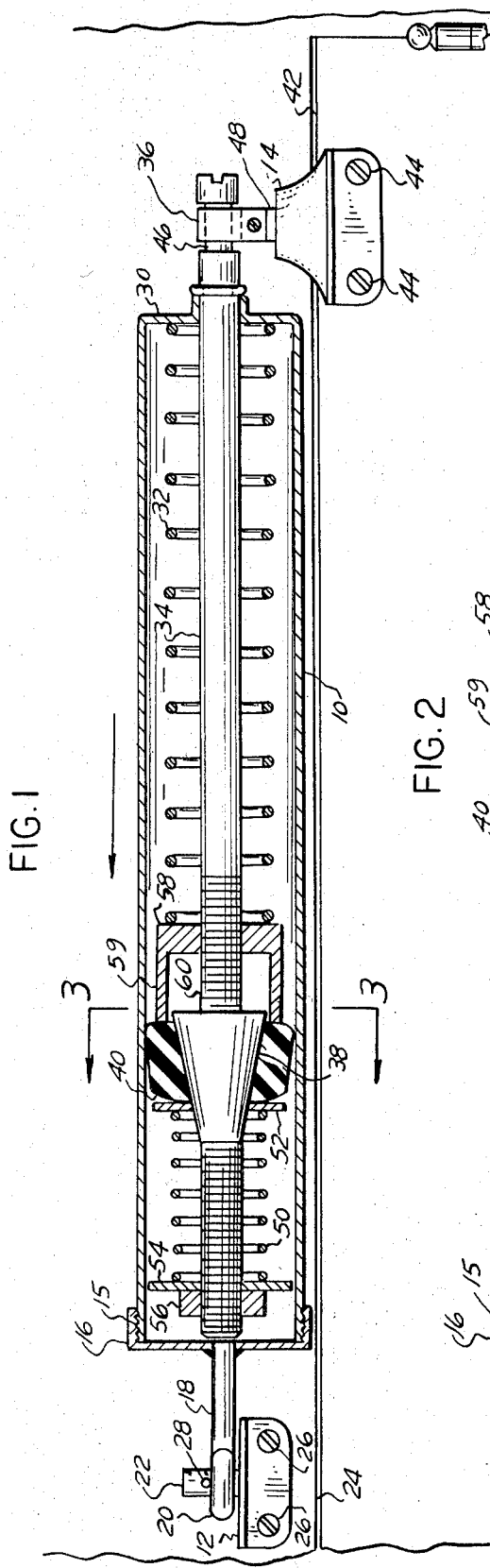
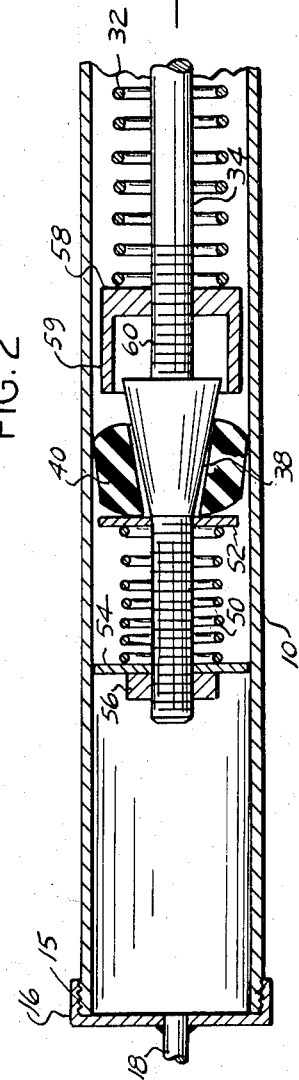
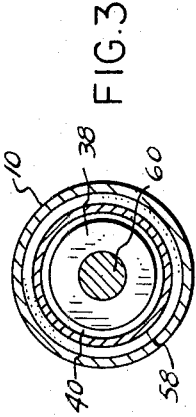
INVENTOR
NASH P. SOGOIAN
BY Hauke, Krass, Gifford, & Patalidis
ATTORNEYS

United States Patent Office 3,555,591
Patented Jan. 19, 1971

3,555,591
FRICTION-TYPE DOOR CHECK
Nash P. Sogoian, 1417 21st St.,
Detroit, Mich. 48216
Filed June 25, 1968, Ser. No. 739,886
Int. Cl. E05f *3/16*
U.S. Cl. 16—49                                              3 Claims

ABSTRACT OF THE DISCLOSURE

A door check formed of a tubular housing with springs, a friction retarding element, and a cone-shaped wedge therein in which one end of the housing is pivotally held to the door frame. A rod extending from the other end is pivotally attached to the door. As the door is opened the spring is readily compressed, and as the door is released the spring automatically closes the door and at the same time forces the wedge into the friction element which bears against the inner surface of the housing retarding the closing of the door. A second spring is provided for maintaining the friction retarding element against the wedge during the opening of the door.

BACKGROUND OF THE INVENTION

(I) Field of the invention

This invention relates to door checks and more particularly to a combination spring and friction door check in which a wedge is provided for pushing the friction element against the interior of the housing to retard closing.

(II) Description of the prior art

Conventional door checks utilize hydraulic or pneumatic means to retard closing of the door. These are expensive and tend to malfunction because of leaks. Also in the prior art, various types of spring and friction door checks have been designed. One such design utilizing a wedge to hold a friction element against the interior of the tubular housing is disclosed in U.S. Pat. No. 2,063,-526, issued Dec. 8, 1936, to William F. Snowdon. The disadvantages of such a door check includes the uneven wearing of the inelastic friction elements, much like the wearing of a brake shoe on an automobile, so that uneven closing of the door will result. The uneven wearing of the inelastic friction elements make it necessary to provide an external adjustment mechanism resulting in a complex and expensive to manufacture design.

SUMMARY OF THE INVENTION

The present invention overcomes these difficulties of the prior art by providing a door check which includes a tubular housing pivotally attached at one end to the door frame and a rod extending from the other end pivotally attached to the door. Within the housing a coil spring is mounted on the rod between the end of the housing from which the rod extends and a threaded member on the rod so that as the door is opened the coil spring will be compressed. A cone-shaped wedge is formed on the rod with the diametrically larger end of the wedge next to the threaded member. A toroidal shaped elastic friction element is positioned around the wedge so that the wedge will force the elastic element against the interior of the housing as the door is closed. A second coil spring mounted on the inner end of the rod is provided for holding the elastic element on the cone-shaped wedge. The threaded member which may be adjusted by rotating the rod engages the elastic friction element so as to regulate the amount the elastic element is permitted to move up on the wedge.

As the door is opened the rod is pulled from the tubular housing resulting in the first mentioned spring being compressed between one end of the housing and the threaded member on the rod. With the opening of the door the elastic element is displaced toward the diametrically smaller end of the cone-shaped wedge thus resulting in little resistance to the opening of the door. When the door is released from the open position the first mentioned spring will exert a force on the threaded member tending to pull the rod into the tubular housing and resulting in the closing of the door. As the door begins to close the wedge will be forced into the elastic element which will be expanded against the inner surface of the housing so as to retard the closing of the door.

The preferred door check is a spring and friction check utilizing a wedge, a toroidal shaped elastic friction element, and a simple inexpensive external adjustment mechanism. The friction element is forced against the inner surface of the housing by the cone-shaped wedge to retard the closing of the door. Due to the elasticity of the friction element the preferred door check will be almost completely self-compensating for any resulting wear.

BRIEF DESCRIPTION OF THE DRAWINGS

A more complete understanding of the present invention will be provided by reference to the accompanying drawing illustrating a preferred embodiment of the invention in which like reference characters refer to like parts throughout the several views and in which:

FIG. 1 is a view showing a longitudinal section through the tubular housing with parts shown in elevation;

FIG. 2 is a similar view with the friction element partly drawn through the tubular housing by the opening movement of the door; and FIG. 3 is a cross section view taken on line 3—3 of FIG. 1.

DESCRIPTION OF THE PREFERRED EMBODIMENT

In the drawing the door check is shown as it may be made wherein numeral 10 indicates the tubular housing, numeral 12 a bracket for attaching one end of the device to a door frame, and numeral 14 a bracket for attaching the opposite end of the device to a door.

The housing 10 is formed at one end with threads 15 for engaging cap 16 having a rod 18, with an eye 20 at the outer end, fixedly mounted therein and extending from the end of the cap. The eye 20 is placed over a pin 22 on the bracket 12 which is fixedly attached to a door frame 24 by screws 26. The eye 20 is held on the pin 22 by a cotter pin or the like, 28. A closure 30 is formed on the end of housing 10 providing a seat for a spring 32. The spring 32 is positioned around a rod 34, one end of which is attached by means of a clamp 36 to a pin 48 which is pivotally mounted in the bracket 14. The bracket 14 is attached to the rear portion of a door 42 by screws 44. The clamp 36 is loosely attached to rod 34 within a groove 46 to allow rotation of the rod. A frusto-conical wedge 38 is formed near the other end of rod 34 and a toroidal shaped elastic friction element 40 is carried by the wedge 38. The friction element 40 may be made of rubber or any other suitable elastic material.

FIG. 1 shows the position of the friction element 40 on the wedge 38 when the door 42 is closed. A light spring 50 is provided at the inner end of the rod 34 with one end engaging a plate 52, abutting against one end of the friction element 40 and the other end resting against a plate 54 held on the end of the rod 34 by a nut 56. As the door 42 is opened the friction element 40 will be drawn off the wedge 38 by the friction created between the element 40 and the interior of the housing 10, thus allowing the parts 10 and 34 to travel freely during the opening movement of the door 42. This opening movement also compresses the spring 32, one end of which bears against the closure 30 and the inner end of which bears against a threaded member 58 held on rod 34 by threads 60. Threaded member 58 has a cylindrical extension 59 for engaging friction element 40 to control the amount the friction element is permitted to move up on the wedge 38. The position of member 58 can be regulated by rotating rod 34. The position of friction element 40 on the wedge 38 and the compression of spring 32 as the door is opened is better illustrated in FIG. 2. As soon as the door is released the friction element 40 moves up on the wedge 38 until extension 59 is reached, thus radially expanding the element 40 to force the outer surface of element 40 against the inner surface of the housing and retarding the closing of the door. Since the element 40 is elastic and is radially expanded by the wedge 38, wear will be even and the retarding action will be uniform throughout the closing movement.

It is apparent that a door check has been disclosed which can be manufactured much more inexpensively than conventional hydraulic or pneumatic type door checks and even much more inexpensively than previously provided friction-type door checks. It is also apparent that although I have described a single embodiment of my invention many changes and modifications can be made without departing from the spirit of the invention as expressed in the appended claims.

What is claimed is:
1. A door check of the type described comprising:
a tubular housing having one end rigidly attached to a door frame, said tubular housing having a uniform inner diameter along a selected length thereof;
a rod slidably disposed in said housing and having one end extending therefrom for pivotal attachment to said door;
resilient means within said housing disposed around said rod between an inner end of said housing and an abutment on said rod for resisting the opening of said door and for causing closing of said door;
an actuating member of a selected length and operatively connected to said rod within said housing, means limiting the movement of said actuating member to within said housing selected length, said actuating member having inclined surfaces;
a friction member having a length less than the length of said actuating member and disposed around said actuating member, said friction member adapted to frictionally contact said inclined surfaces of said actuating member and the internal uniform surface of said housing between said limiting means;
means normally biasing said friction member into frictional contact with said actuating member and said housing;
means disposed on said rod and axially adjustable with respect thereto to limit the frictional engagement of said friction member with said actuating member; and
said friction member being of a deformable elastic material, and said actuating member being of a cylindrical, cone-shaped form to thereby evenly radially expand said friction member into frictional contact with the inner surface of said housing.

2. A door check as described in claim 1, wherein said friction member is of rubber or the like material, having a toroidal shape, provided with a tapered aperture for coaxial engagement with said cylindrical, cone-shaped actuating member.

3. The door check as described in claim 1, wherein said rod is attached to said door and said cylindrical cone shaped actuating member is adapted to expand said friction member against the inner surface of said housing during closing of said door and to axially recede outwardly of said friction member during the opening of said door to thereby release the frictional engagement of said friction member with said housing and said actuating member.

References Cited
UNITED STATES PATENTS

| | | | |
|---|---|---|---|
| 2,063,526 | 12/1936 | Snowdon | 16—49 |
| 2,167,409 | 7/1939 | Schmidt | 16—49 |
| 2,688,150 | 9/1054 | Roussel | 16—82X |
| 2,993,506 | 7/1961 | Hillman | 251—64X |

MARVIN A. CHAMPION, Primary Examiner

I. A. CALVERT, Assistant Examiner

U.S. Cl. X.R.

16—82